S D. SKIFF.
Improvement in Mitre-Boxes.

No. 130,665. Patented Aug 20, 1872.

Attest
Herman Merrell
John Rode

Inventor
Stephen D. Skiff.
By Wood & Boyd
attys.

UNITED STATES PATENT OFFICE.

STEPHEN D. SKIFF, OF COLUMBIA, OHIO.

IMPROVEMENT IN MITER-BOXES.

Specification forming part of Letters Patent No. 130,665, dated August 20, 1872.

Specification describing certain Improvements in Miter-Boxes, invented by STEPHEN D. SKIFF, of Columbia, in the county of Hamilton and State of Ohio.

My invention consists in an improvement in miter-boxes, whereby the saw may be supported in its proper position by suitable means, which insure its operation in a vertical line, and so that it may be adjusted to cut the wood at any desired angle, by simply revolving the saw with its supports upon the miter-box, which box and the material to be cut always lie in a fixed plane, usually longitudinally with the bench or truss upon which the box is placed.

Figure 1:
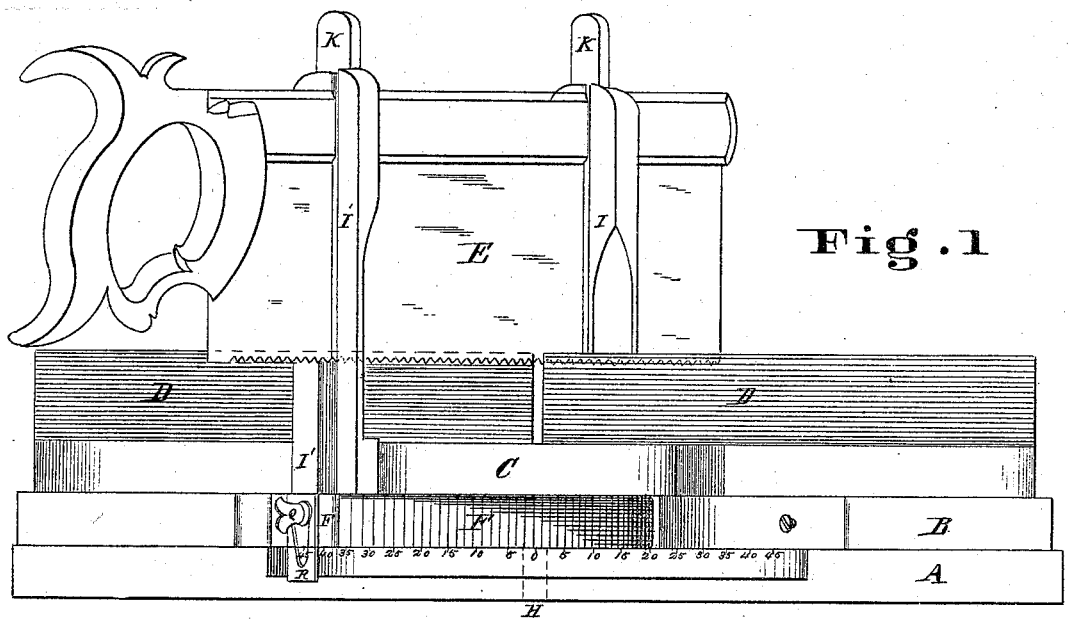
Figure 2:
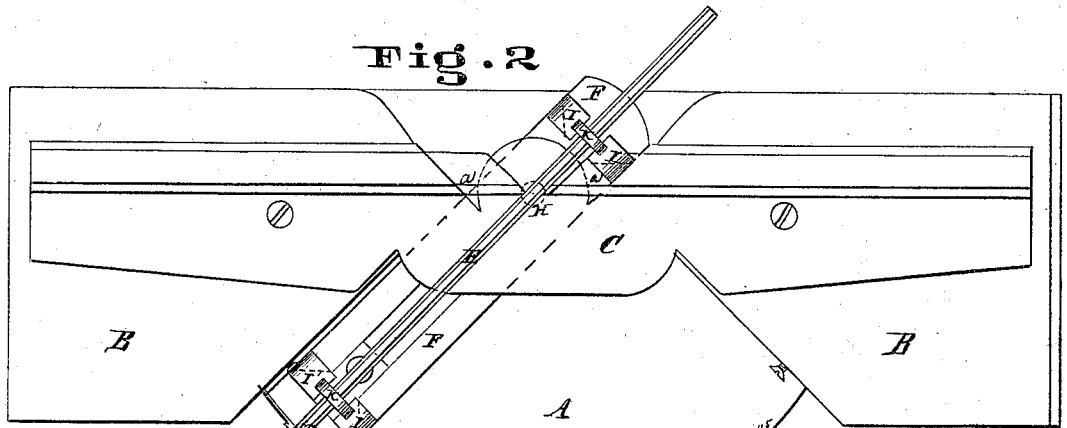
Figure 4:
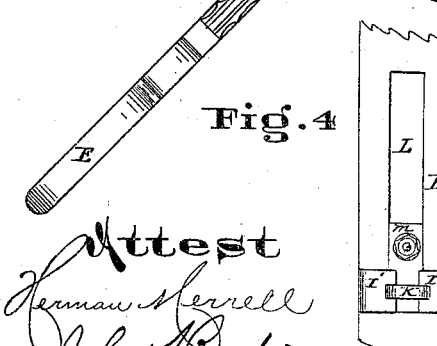
Figure 3:
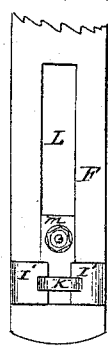
Figure 5:
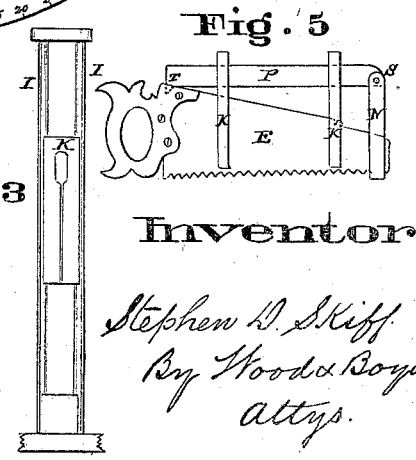

Figure 1 is a side elevation of a miter-box embodying my invention. Fig. 2 is a plan of the same, both having the saw in position. Fig. 3 is a front elevation of the saw-support. Fig. 4 is a plan of the front end of the pivoted sill, to which the guides are attached. Fig. 5 is a side elevation of a saw with extension back, and guides in place.

It is obvious that the saw-supports I I may be so attached to the sill F by means of a universal joint, as to enable the saw to cut bevel-miters.

A is the base-board, the front of which is semicircular, and graduated so that the saw-guides can be set at any angle. It may also be cut away under the graduated edge, for the convenience of setting the guides. B B are plates, between the base-board A and the platform C, upon which the material to be sawed is laid, and have miter-shoulders for the frame of the saw-supports to rest against when the saw is at the position shown in Fig. 2. D is a straight elevated back-plate for the material to be sawed to rest against, and has a cut in its center for the saw to work through, as in ordinary miter-boxes. E is an ordinary miter-saw. F is the sill or base to which the saw-supports are attached, and is pivoted to the bed A or platform C, or to both at the point H, as shown, Figs. 1 and 2, so as to be movable from the position shown to any other upon the semicircle of the plate A, without moving the uprights I I from close contact with the material to be sawed. I am aware that miter-boxes have been made with swinging arms to which upright guides are attached, but these arms are so pivoted that, when set for cutting less than a miter, their ends extend beyond the box, and the extension at the back of the box increases as the angle of the arm decreases. This extension is very objectionable, as it takes up room, is in the way, and is liable to get broken or injured, and also necessitates the adjustment of the guide every time that the angle is changed; and further, in sawing true miters or nearly so, the guides are so far apart as not to admit of the use of a short saw, and to be practically useless as supports to a long one. I am also aware that miter-boxes have been made with movable pivoted bed-plates which carry the material to be sawed; but these are objectionable, for the reason that in cutting long lumber the end furthest from the saw is carried off the bench and is difficult and inconvenient to support.

I I are uprights attached to the sill F close to the back of the plate D, and which are grooved or otherwise appropriately arranged to receive the cross-head guides K, so as to allow a free vertical movement of said guides. I' I' are similar posts to I I, except that instead of being rigidly attached to the sill F, the front end of said sill is grooved, as shown at L, Fig. 4, and said uprights I I are made to slide in said groove, and are securely fixed in any position by an ordinary set-screw, $m$, or other appropriate device. The object in having the uprights I' I' adjustable is to have the saw-supports as near each other as possible, thereby the better guiding the saw, and, when close, allowing an increased sweep of the saw. K K are cross-heads or guides, with arms extending downward, constructed to slide within the uprights I I'. The cross-head rests upon the back of the saw, and the arms extend down close to the teeth of the saw, but not so as to come in contact with them. When an ordinary miter-saw, such as is shown in Fig. 1, is used, the guides will be carried up and down as the saw moves up or down, by virtue of the increased thickness of the saw's back; but when a saw is used which has not an enlarged back, or when its back is not parallel to its teeth, as shown in Fig. 5, the guides, when made of wood, will not work well without being loaded, or having a spring to force them to follow the saw. In such cases I use an extension back, P, as shown in Fig. 5.

This extension is made of light metal. The part N is slotted to fit the end of the saw, and has a seat within said slot for the end tooth of the saw. It also has a hinge at S, and a hook, as shown by dotted lines, at T. When the end tooth is placed in its seat, the whole is made fast and kept in place by drawing said hook T into its seat. The saw and its extension back work within the guides K, as before described, for a saw without said extension. When the extension P is used, the guides K have a pin for the under side of the extension to rest upon.

When saws with thick backs are used, the thickness of the lumber capable of being sawed is limited to the width of the saw less its back; but with my extension, as shown in Fig. 5, any thickness of lumber can be cut, as the extension is thin and follows the saw to any depth. I am aware that backs have been attached to "miter" saws, but these are liable to the same objection as saws with backs, and are not designed to extend the back or render it parallel with the teeth, and do not follow through the cut of the saw. By my arrangement of the extension it is not necessary to remove it from the box when removing or changing the saw.

The sill F with its uprights and guides are kept in the desired position by means of a cam-yoke, R, which clasps a flange upon the under edge of the semicircle of the plate A, by means of the thumb-cam Q being turned so as to tighten it.

I claim as my invention—

The semicircular graduated base-board A, supporting the end plates B B, platform C, and the back plate D provided with a central slot and two recesses $a\ a$, in combination with the longitudinally-grooved sill F, yoke R, cam Q, uprights I I, and movable cross-head guides K K, all constructed and arranged as and for the purpose set forth.

STEPHEN D. SKIFF.

Witnesses:
  R. J. HYNDMAN,
  E. BOYD.